United States Patent
Mulvey et al.

[11] Patent Number: 5,931,200
[45] Date of Patent: Aug. 3, 1999

[54] CONNECTOR SYSTEM FOR ATTACHMENT OF FLEXIBLE HOSE TO PEX SUPPLY LINE

[75] Inventors: Philip A. Mulvey, Carson City; Billy J. Hobbs, Gardnerville, both of Nev.

[73] Assignee: LSP Products Group, Inc., Carson City, Nev.

[21] Appl. No.: 08/873,424

[22] Filed: Jun. 12, 1997

Related U.S. Application Data

[63] Continuation-in-part of application No. 08/833,929, Apr. 10, 1997, abandoned, and application No. 08/833,883, Apr. 10, 1997
[60] Provisional application No. 60/019,622, Jun. 12, 1996.
[51] Int. Cl.⁶ .................................................. F16L 11/00
[52] U.S. Cl. ........................ 138/109; 138/110; 138/178; 285/3; 285/4
[58] Field of Search ........................... 138/109, 110, 138/178; 285/416, 418, 3, 4

[56] References Cited

U.S. PATENT DOCUMENTS

| | | | |
|---|---|---|---|
| 2,449,754 | 9/1948 | Seitz | 138/178 |
| 3,217,710 | 11/1965 | Beall et al. | 285/4 |
| 4,106,562 | 8/1978 | Szentmihaly | 138/109 |
| 4,114,656 | 9/1978 | Kish | 138/109 |
| 4,410,391 | 10/1983 | Thomas et al. | 138/97 |
| 4,611,828 | 9/1986 | Brunet | 285/3 |
| 4,675,780 | 6/1987 | Barnes et al. | 138/109 |
| 5,483,412 | 1/1996 | Albino et al. | 138/125 |
| 5,513,675 | 5/1996 | Toyama et al. | 138/109 |

Primary Examiner—Denise L. Ferensic
Assistant Examiner—James F. Hook
Attorney, Agent, or Firm—Locke Liddell & Sapp LLP and Monty L. Ross

[57] ABSTRACT

A connector system that is useful for attaching a flexible hose assembly to PEX pipe produced by either the Engle or Silane process. One embodiment relates to a connector system using a nipple in combination with either an expandable PEX ring or a compression ring and threaded nut. The nipple has on one end a hose barb that is attachable to a flexible hose segment and on the other end a male connector attachable to a PEX supply pipe. Another embodiment relates to a flexible hose assembly comprising a flexible hose segment and at least one connector system comprising a nipple attached to one end of the hose segment in combination with either an expandable PEX ring or a compression ring and nut for securing the end of the nipple opposite the hose segment to a PEX pipe.

13 Claims, 2 Drawing Sheets

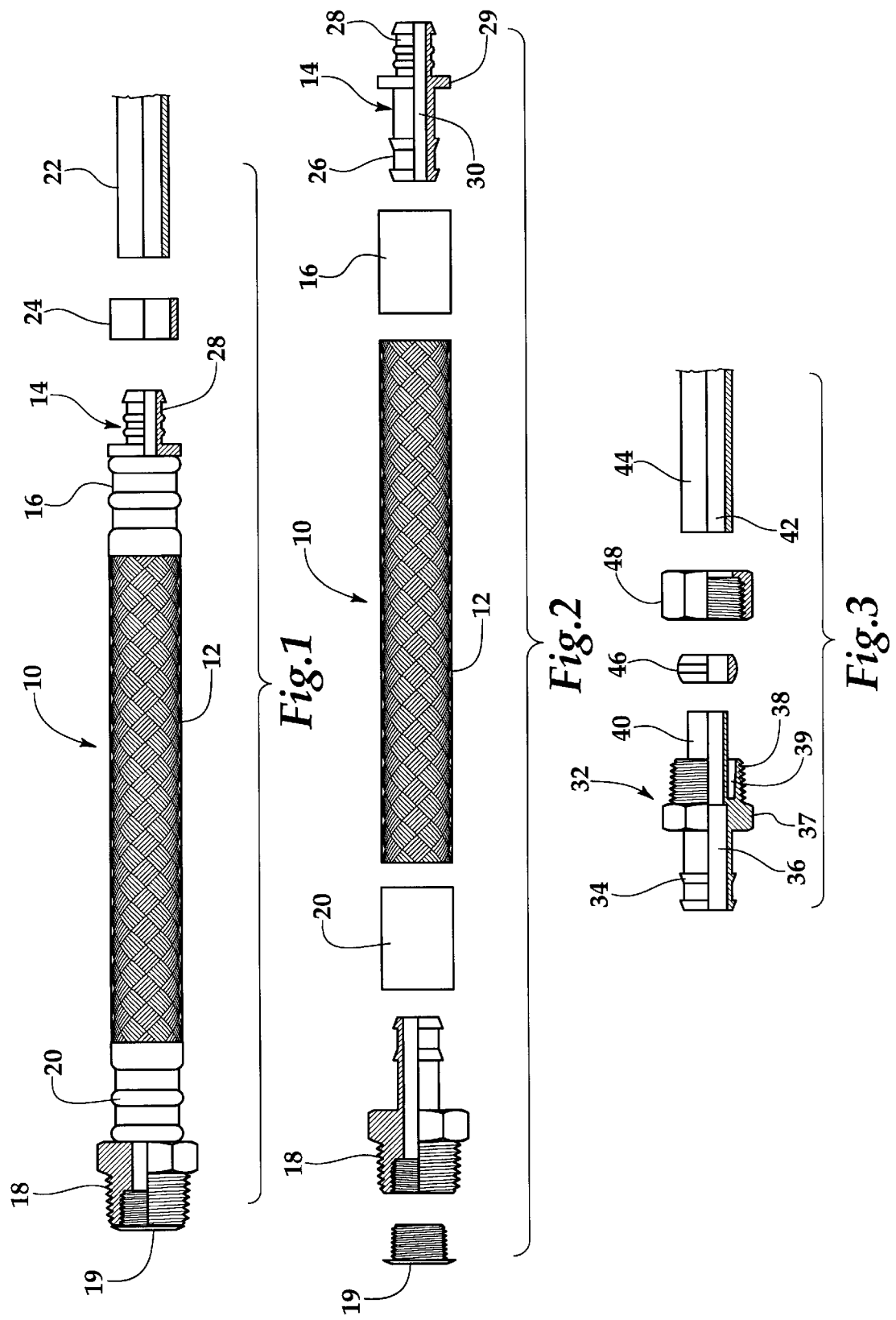

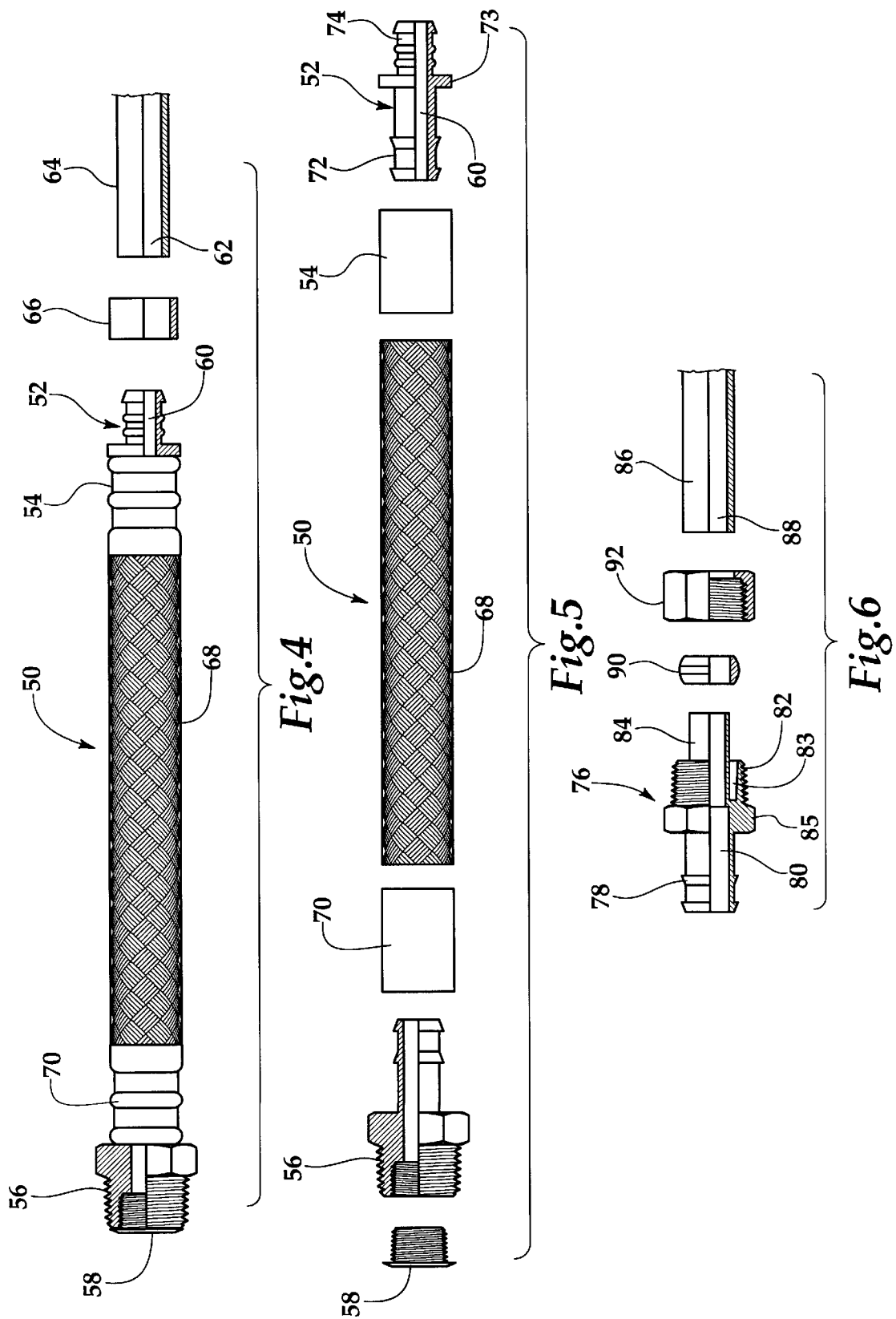

CONNECTOR SYSTEM FOR ATTACHMENT OF FLEXIBLE HOSE TO PEX SUPPLY LINE

CROSS-REFERENCE TO RELATED APPLICATIONS

This application claims priority based upon Provisional Application No. 60/019,622, filed Jun. 12, 1996, as to the subject matter disclosed therein, and is a continuation-in-part of U.S. application Ser. Nos. 08/833,929 (now abandoned) and 08/833,883, filed Apr. 10, 1997.

BACKGROUND OF THE INVENTION

1. Field of the Invention

This invention relates to hose connectors, and more particularly, to a hose connector system specially adapted for use in connecting a flexible hose assembly to crosslinked polyethylene (PEX) supply line.

2. Description of Related Art

It is well known that in recent years polymeric pipe and tubing materials have displaced conventional steel pipe and copper tubing in a variety of services and applications. One such polymeric material, polybutylene, has now been withdrawn from the market. Other polymeric materials, such as ethylene propylene diamine (EPDM) rubber, polyvinyl chloride (PVC) and polyethylene (PE), remain in widespread use. Rubbery polymers, although flexible, are frequently susceptible to attack and degradation by chloramine compounds. PVC tubing does not flake off when contacted by chloramine compounds for extended periods, but has a tendency to discolor and can also burst under pressure. PE also has a tendency to rupture when used at higher temperatures and pressures.

PEX tubing, stronger than PE tubing, has previously been used in hydronic applications for recirculating hot water in home heating systems and to keep driveways and steps clear of snow and ice. More recently, PEX has been used in home construction for potable water supply lines inside walls, replacing the use of other metal or plastic materials. PEX tubing is also being used for riser tubes, without attached end fittings.

PEX pipe and tubing is generally crosslinked according to one of two processes, which are popularly known as the "Silane" process and the "Engle" process. PEX pipe and tubing crosslinked by the Engle process tend to have thinner walls and more flexibility for a given nominal diameter than those made by the Silane process.

Pipes made of crosslinked polyolefin resins and tubular couplings for such pipes are disclosed in U.S. Pat. No. 4,927,184. Conduits comprising a hose having a lining layer of crosslinked polyethylene are disclosed in U.S. Pat. No. 5,349,989. A connection device said to be useful for outlet fittings in an installation for conveying water for industrial or domestic use is disclosed in EP 0 085 329 B1. Flexible hoses useful for connecting a potable water source to sanitary appliances such as faucets, toilet tanks, dishwashers, water heaters and clothes washing machines are disclosed, for example, in U.S. Pat. No. 5,622,210 and other references cited therein.

SUMMARY OF THE INVENTION

The invention disclosed herein is a new connector system useful for attaching a flexible hose assembly to PEX pipe produced by either the Engle or Silane process. One embodiment of the invention relates to a new connector system preferably comprising a nipple in combination with either an expandable PEX ring or a compression ring and threaded nut. The nipple preferably has on one end a hose barb that is attachable to a flexible hose segment and on the other end a male connector attachable to a PEX supply pipe. Another embodiment of the invention relates to a flexible hose assembly comprising a flexible hose segment and at least one connector system comprising a nipple attached to one end of the hose segment in combination with either an expandable PEX ring or a compression ring and nut for securing the end of the nipple opposite the hose segment to a PEX pipe.

BRIEF DESCRIPTION OF THE DRAWINGS

The apparatus of the invention is further described and explained in relation to the following figures of the drawings wherein:

FIG. 1 is a front elevation view, partially in section, depicting a flexible hose assembly with a preferred connector system of the invention (for metal crimp ring connection to Silane method PEX) in proximity to the end of a PEX fluid supply line;

FIG. 2 is a front elevation view, partially in section, of the flexible hose assembly of FIG. 1 with the flexible hose assembly exploded to better illustrate the parts of the barbed nipple of the connector system;

FIG. 3 is a front elevation view, partially in section, depicting an alternate embodiment of the preferred connector system of the invention (for threaded compression connection to Silane method PEX) in proximity to the end of a PEX fluid supply line;

FIG. 4 is a front elevation view, partially in section, depicting a flexible hose assembly with a preferred connector system of the invention (for PEX ring connection to Engle method PEX) in proximity to the end of a PEX fluid supply line;

FIG. 5 is a front elevation view, partially in section, of the flexible hose assembly of FIG. 4 with the flexible hose assembly exploded to better illustrate the parts of the barbed nipple of the connector system; and FIG. 6 is a front elevation view, partially in section, depicting an alternate embodiment of the preferred connector system of the invention (for threaded compression connection to Engle method PEX) in proximity to the end of a PEX fluid supply line.

DESCRIPTION OF THE PREFERRED EMBODIMENTS

FIGS. 1, 2 and 3 depict apparatus useful for making connections to Silane method PEX. FIGS. 1 and 2 relate to a crimped connection to Silane method PEX and FIG. 3 relates to a compression ring connection to Silane method PEX. Referring to FIGS. 1 and 2, flexible hose assembly 10 preferably comprises a connector system comprising barbed nipple 14 (attached to flexible hose segment 12 by crimp ring 16) in combination with metal crimp ring 24. Flexible hose segment 12 preferably comprises an extruded polymeric material, and may comprise a plurality of polymeric layers applied using coextrusion or other available known technologies. If desirable for use in a particular application, the polymeric layer(s) can be reinforced or overlaid with a surrounding protective sheath made of braided or woven metal strands, synthetic fibers, or any other similarly effective material, whether or not braided or woven. At the opposite end of hose segment 12, another end fitting 18 is attached to hose segment 12 by crimp ring 20. End fitting 18 as shown is a conventional metal fitting with a dielectric insert 19 as would be used, for example, in a hose connection to a dissimilar metal fitting on a water heater, and does not embody the structure of the connector system of the invention. Crimp rings 16, 20 are preferably made of stainless steel.

Flexible hose assembly 10 of the invention is shown in proximity to PEX fluid supply line 22, which is in position to be attached to nipple 14 as discussed below using metal crimp ring 24. Nipple 14 can be made of either metal or substantially rigid plastic, and is preferably made of nickel plated brass. Crimp ring 24 is preferably made of copper or another similarly effective metal. Referring to FIG. 2, nipple 14 preferably further comprises longitudinal bore 30 surrounded by a first barbed section 26 insertable into frictional engagement with the ID of hose segment 12 and second barbed section 28 insertable into frictional engagement with the ID of PEX supply line 22 (FIG. 1). First and second barbed sections 26, 28 are desirably separated by annular flange 29.

Referring again to FIG. 1, connection of hose assembly 10 to PEX supply line 22 is desirably achieved by first sliding metal crimp ring 24 over the end of PEX supply line 22 and thereafter inserting hose barb 28 of nipple 14 into frictional engagement with the ID of supply line 22. Once hose barb 28 is fully seated, metal crimp ring 24 is positioned around the portion of PEX supply line 22 into which hose barb 28 has been inserted and crimped to complete the attachment.

FIG. 3 depicts an alternate embodiment of the hose connector system of the invention comprising nipple 32, compression ring 46 and threaded compression nut 48 in proximity to PEX supply line 44. Nipple 32 and compression nut 48 are preferably made of metal or plastic, and can be plated or unplated. A preferred material for use in making nipple 32 and compression nut 48 is nickel plated brass. Compression ring 46 can be made of metal or plastic as desired. Nipple 32 preferably further comprises longitudinal bore 36 surrounded by barbed section 34, polygonal flange 37, and externally threaded skirt 38 and tubular male extension 40 with annular space 39 defined therebetween. Although not shown in FIG. 3, it is understood that hose barb 34 of nipple 32 is desirably inserted into and attached by crimping to a flexible hose segment as previously described in relation to nipple 14. Internally threaded compression nut 48 and compression ring 46 are desirably slipped onto PEX supply line 44, and tubular male extension 40 of nipple 32 is then inserted into ID 42 until the end of supply line 44 is fully seated in annular space 39 under externally threaded skirt 38. Compression ring 46 is placed in abutting contact with skirt 38 and compression nut 48 is threaded onto threaded skirt 38, thereby tightening against compression ring 46 and securing nipple 32 to PEX supply line 44.

FIGS. 4, 5 and 6 depict apparatus useful for making connections to Engle method PEX. FIGS. 4 and 5 relate to an elastomeric connection to Engle method PEX and FIG. 6 relates to a compression ring connection to Engle method PEX. Referring to FIGS. 4 and 5, flexible hose assembly 50 preferably comprises a connector system comprising barbed nipple 52 (attached to flexible hose segment 68 by crimp ring 54) in combination with PEX ring 66. Flexible hose segment 50 preferably comprises an extruded polymeric material, and may comprise a plurality of polymeric layers applied using coextrusion or other available known technologies. If desirable for use in a particular application, the polymeric layer(s) can be reinforced or overlaid with a surrounding protective sheath made of braided or woven metal strands, synthetic fibers, or any other similarly effective material, whether or not braided or woven. At the opposite end of hose segment 68, another end fitting 56 is attached to hose segment 68 by crimp ring 70. End fitting 56 as shown is a conventional metal fitting with a dielectric insert 58 as would be used, for example, in a hose connection to a dissimilar metal fitting on a water heater, and does not embody the structure of the connector system of the invention. Crimp rings 54, 70 are preferably made of stainless steel.

Flexible hose assembly 50 of the invention is shown in proximity to PEX fluid supply line 64, which is in position to be attached to nipple 52 as discussed below using PEX ring 66. Nipple 52 can be made of either metal or substantially rigid plastic, and is preferably made of nickel plated brass. Referring to FIG. 5, nipple 52 preferably further comprises longitudinal bore 60 surrounded by a first barbed section 72 insertable into frictional engagement with the ID of hose segment 68 and second barbed section 74 insertable into frictional engagement with the ID of PEX supply line 64 (FIG. 4). First and second barbed sections 72, 74 are desirably separated by annular flange 73.

Referring again to FIG. 4, connection of hose assembly 10 to PEX supply line 64 is desirably achieved by first sliding PEX ring 66 over the end of PEX supply line 64, expanding its diameter, and then inserting hose barb 74 of nipple 52 into frictional engagement with the ID of supply line 64. Once hose barb 73 is fully seated, PEX ring 66 is released and allowed to relax around the end of supply line 64, thereby causing it to conform to hose barb 74 and holding it in fixed relation to nipple 52 to complete the attachment.

FIG. 6 depicts an alternate embodiment of the hose connector system of the invention comprising nipple 76, compression ring 90 and threaded compression nut 92 in proximity to PEX supply line 86. Nipple 76 and compression nut 92 are preferably made of metal or plastic, and can be plated or unplated. A preferred material for use in making nipple 76 and compression nut 92 is nickel plated brass. Compression ring 90 can be made of brass or any other metal as desired. Nipple 76 preferably further comprises longitudinal bore 80 surrounded by barbed section 78, polygonal flange 85, and externally threaded skirt 82 and tubular male extension 84 with annular space 83 defined therebetween. Although not shown in FIG. 6, it is understood that hose barb 78 of nipple 76 is desirably inserted into and attached by crimping to a flexible hose segment as previously described in relation to nipple 14. Internally threaded compression nut 92 and compression ring 90 are desirably slipped onto PEX supply line 86, and tubular male extension 84 of nipple 76 is then inserted into ID 88 until the end of supply line 86 is fully seated in annular space 83 under externally threaded skirt 82. Compression ring 90 is placed in abutting contact with skirt 82 and compression nut 92 is threaded onto threaded skirt 82, thereby tightening against compression ring 90 and securing nipple 76 to PEX supply line 86.

It will be apparent to those of ordinary skill in the art upon reading this disclosure that hose assemblies embodying the connector system of the invention can have end fittings opposite the subject connector system that are different from end fittings 18, 56, which are depicted herein for illustrative purposes only. The particular type of end fitting will of course depend upon factors such as the intended application and the structure to which the fitting must be attached. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A flexible hose assembly comprising at least one end fitting further comprising a connector system useful for connecting an end of a flexible hose segment to a PEX fluid supply line, the system comprising a nipple having a continuous longitudinal bore, a first barbed end insertable into and crimped by a first metal crimp ring to the flexible hose segment, a second barbed end insertable into and attachable to the PEX fluid supply line, and an annular flange disposed between the first and second barbed ends, said flange having an outside diameter greater than the inside diameter of the hose and greater than the inside diameter to the PEX supply line, in combination with a second metal crimp ring for securing the PEX fluid supply line around the second barbed end.

2. The flexible hose assembly of claim 1 wherein the nipple is made of metal.

3. The flexible hose assembly of claim 2 wherein the metal is brass plated with nickel.

4. The flexible hose assembly of claim 1 wherein the nipple is made of plastic.

5. A flexible hose assembly comprising at least one end fitting further comprising a connector system useful for connecting an end of a flexible hose segment to a PEX fluid supply line having a predetermined inside diameter, the system comprising a nipple, a compression ring and a threaded compression nut, the nipple having a first barbed end insertable into frictional engagement with the flexible hose segment, a polygonal flange adjacent to the first barbed end, a coaxial tubular male extension member projecting away from the polygonal flange opposite the first barbed end and having an outside diameter slightly less than the predetermined inside diameter of the PEX fluid supply line, and an externally threaded annular skirt member concentrically disposed around the tubular male extension member and defining an annular recess therebetween.

6. The flexible hose assembly of claim 5 wherein the annular skirt member is shorter than the tubular male extension member.

7. The flexible hose assembly of claim 5 wherein the nipple is made of metal.

8. The flexible hose assembly of claim 7 wherein the metal is brass plated with nickel.

9. The flexible hose assembly of claim 5 wherein the nipple is made of plastic.

10. A flexible hose assembly comprising at least one end fitting further comprising a connector system useful for connecting an end of a flexible hose segment to a PEX fluid supply line, the system comprising a nipple having a first barbed end inserted into and crimped by a metal crimp ring to the flexible hose segment, a second barbed end insertable into and attachable to the PEX fluid supply line, and an annular flange disposed between the first and second barbed ends, in combination with an expandable PEX ring for securing the PEX fluid supply line around the second barbed end.

11. The flexible hose assembly of claim 10 wherein the nipple is made of metal.

12. The flexible hose assembly of claim 11 wherein the metal is brass plated with nickel.

13. The flexible hose assembly of claim 10 wherein the nipple is made of plastic.

* * * * *